United States Patent
Yamazaki et al.

(10) Patent No.: US 7,265,460 B2
(45) Date of Patent: Sep. 4, 2007

(54) POSITION DETECTING DEVICE OF LINEAR MOTOR

(75) Inventors: Tsunehiko Yamazaki, Aichi pref. (JP); Naoomi Miyakawa, Aichi pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 270 days.

(21) Appl. No.: 11/156,015

(22) Filed: Jun. 17, 2005

(65) Prior Publication Data
US 2006/0001390 A1    Jan. 5, 2006

(30) Foreign Application Priority Data
Jul. 1, 2004    (JP)    ............... 2004-195355

(51) Int. Cl.
    H02K 41/00    (2006.01)
    H03K 41/03    (2006.01)
(52) U.S. Cl. .................................. 310/12; 318/135
(58) Field of Classification Search ............ 310/12–14, 310/17, 19; 318/135; 73/1.79, 1.81
    See application file for complete search history.

(56) References Cited

U.S. PATENT DOCUMENTS

| | | | |
|---|---|---|---|
| 6,008,552 A | | 12/1999 | Yagoto et al. |
| 6,501,262 B1 * | | 12/2002 | Schneeberger et al. ..... 324/206 |
| 2006/0001390 A1 * | | 1/2006 | Yamazaki et al. ......... 318/135 |
| 2006/0138977 A1 * | | 6/2006 | Kircanski et al. .......... 318/135 |

FOREIGN PATENT DOCUMENTS

| JP | 2002-281729 | 9/2002 |
|---|---|---|
| JP | 2002-281783 | 9/2002 |

OTHER PUBLICATIONS

Chinese Office Action for corresponding Application No. 200510074691.0 dated Sep. 29, 2006.

* cited by examiner

*Primary Examiner*—Karl Tamai
*Assistant Examiner*—David W. Scheuermann
(74) *Attorney, Agent, or Firm*—Renner, Otto, Boisselle & Sklar, LLP

(57) ABSTRACT

The invention provides a device for improving the positioning accuracy of a linear motor. A stator 20 is designed to have two kinds of magnets with different surface magnetism arranged alternately and at uniform intervals along the linear moving direction. A moving member 30 is disposed movably in the linear direction while maintaining a uniform distance from the stator. A detector head 50 formed integrally with the moving member 30 detects the magnetic flux of the stator 20 and sends the data to a control unit 60. The fixed laser length measuring machine 100 irradiates a laser beam LB to a target 110 attached to the moving member, and using the reflected light, measures the distance between the laser length measuring machine and the target highly accurately. The position of the stator 20 used as the magnet scale and the highly accurate position data measured by the laser length measuring machine 100 are compared so as to compute the correction data corresponding to the position of the stator, and the computed value is stored in the storage unit 70 to be utilized for the positioning of the motor.

6 Claims, 5 Drawing Sheets

$\theta = tan^{-1}(sin\theta / cos\theta) \Rightarrow$ POSITION DATA

| POSITION DETECTION DATA | |
|---|---|
| MAGNET SCALE [$\mu$m] | LASER LENGTH MEASURING MACHINE [$\mu$m] |
| 1 | 0.99 |
| 2 | 1.98 |
| 3 | 3.01 |
| 4 | 3.98 |
| 5 | 5.02 |
| . | . |
| . | . |

POSITION DETECTING DEVICE OF LINEAR MOTOR

The present application is based on and claims priority of Japanese patent application No. 2004-195355 filed on Jul. 1, 2004, the entire contents of which are hereby incorporated by reference.

BACKGROUND OF THE INVENTION

1. Field of the Invention

The present invention relates to a position detecting device of a linear motor, which enables the linear motor to carry out position detection and position control alone without a linear scale provided in parallel arrangement for controlling the linear motor, by utilizing the magnet arrangement constituting the linear motor itself as the linear scale for positioning.

2. Description of the Related Art

The linear motor according to the prior art either utilizes a separately provided linear scale arranged in parallel with the linear motor, or comprises a stator constituting the linear motor having two kinds of magnets with different surface magnetism arranged alternately and at uniform intervals along a linear moving direction, and a coil disposed movably in the linear direction while maintaining a uniform distance from the surface of the magnets constituting the stator, wherein the induced voltage occurring between the magnet and coil is detected, and thereby, the position of a moving member with respect to the stator is detected by computing the displacement of induced voltage (refer for example to Japanese Patent No. 3396216 (patent document 1) and Japanese Patent Application Laid-Open Publication No. 2002-281783 (patent document 2).

According to the prior art where a linear motor and a linear scale are used together, it was necessary to provide a mounting means for precisely positioning the linear scale to the linear motor, and to provide a means to block water and dust from entering. Moreover, the assembling of the above means had to be performed with high accuracy, which required high costs even equivalent to the cost for building the linear motor itself.

According to patent document 1 which incorporates the function of a linear scale into the linear motor, the magnets arranged at uniform intervals and constituting the stator are used as a scale, so that if the magnets or the intervals contained errors, such errors were transferred completely as scale errors and deteriorated the scale accuracy.

In practice, it is impossible to form magnets without size errors or to arrange the magnets at uniform intervals without error. So the magnet arrangement inevitably contained some error, limiting the accuracy of the scale.

SUMMARY OF THE INVENTION

The present invention provides a position detecting device of a linear motor that solves the problems of the prior art.

The present invention provides a position detecting device of a linear motor which is built into the linear motor, comprising a stator having two kinds of magnets with different surface magnetism arranged alternately and at uniform intervals along a linear moving direction; a coil, which is a moving member, disposed movably in the linear direction while maintaining a uniform distance from the surface of the magnets constituting the stator; a detector for detecting the magnetic flux of the magnets; a position detecting circuit enabling the detector to detect position; a measuring device for measuring the position of the stator used as a magnet scale for correcting the position detecting circuit and for measuring the variation of arrangement of the magnets or sizes of the magnet members; a storage unit for storing a correction data obtained by comparing the stator position and the result of measurement of the measuring device; and a control unit for correcting the detection position based on the correction data stored in advance when carrying out positioning of the moving member.

Further, the measuring device includes a laser length measuring machine.

According to other aspects of the invention, the measuring device carries out the measurement only once in the initial stage, or carries out the measurement again when an attachment error of the magnet occurs by vibration or the like.

Furthermore, the measuring device carries out the measurement again when an error occurs to the data of the measurement device or the control unit (such as when the data are lost).

Even further, the position detecting circuit, the measuring device or the control unit can be built into the numerical control device.

DETAILED DESCRIPTION OF THE PREFERRED EMBODIMENTS

Figure 1:
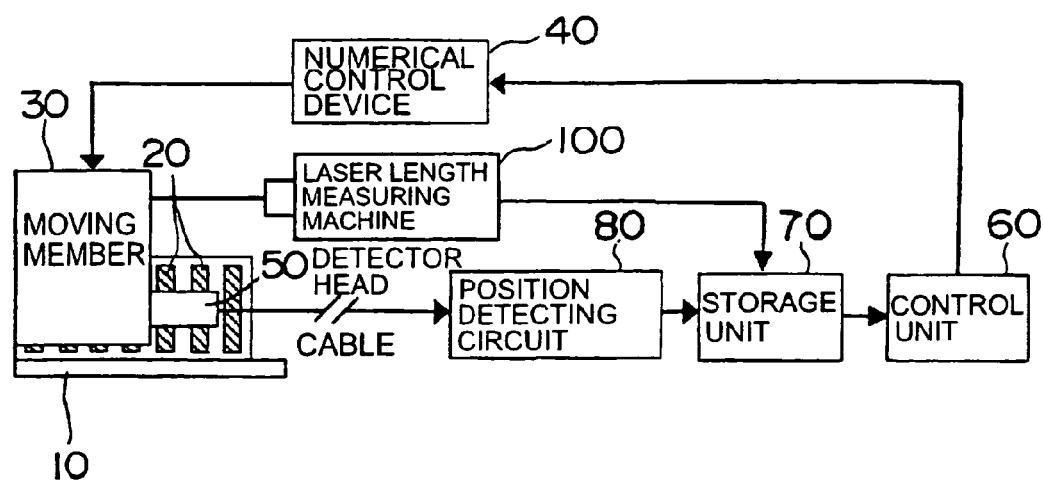
FIG. 1 is an explanatory view showing a measuring device for a position detecting device of a linear motor according to the present invention.
Figure 2:
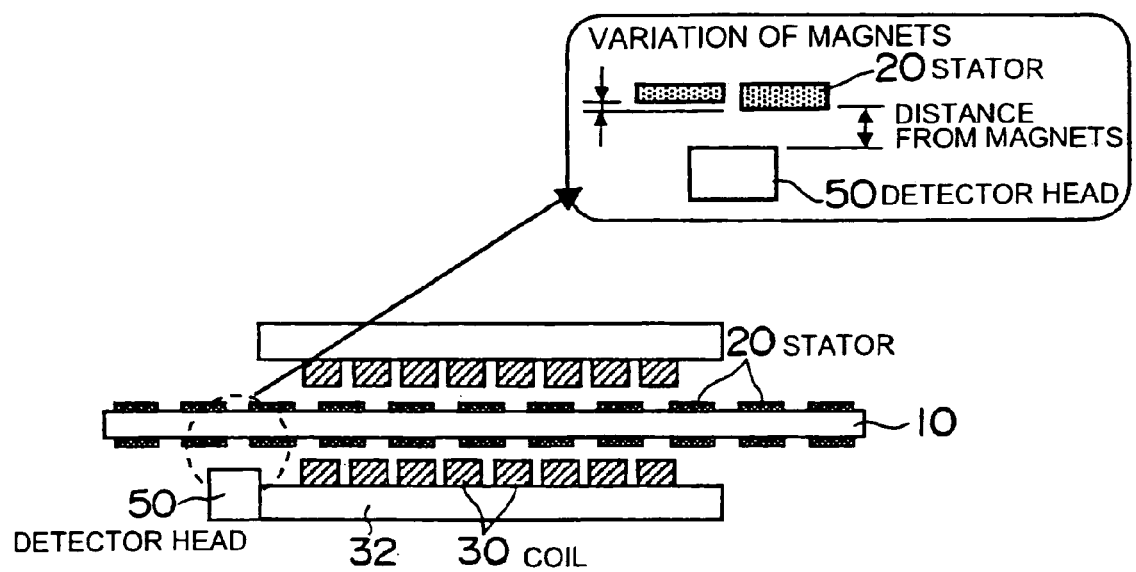
FIG. 2 is a cross-sectional view showing the arrangement of a stator disposed on a base, a moving member housed in a housing, and a detector head 50 attached to the housing of the moving member.

FIG. 1 is an explanatory view showing a measuring device of a position detecting device of a linear motor according to the present invention, and FIG. 2 is a cross-sectional view showing the arrangement of a stator 20 composed of magnets disposed on a base 10, a moving member 30 composed of coils arranged inside a housing 32, and a detector head 50 attached to the housing 32 of the moving member 30.

The position detecting device of a linear motor is composed of, as basic means, a stator 20 arranged at uniform intervals on a linearly formed base 10. A stator 20 is formed so that two kinds of magnets having different surface magnetism are arranged alternately and at uniform intervals along the linear moving direction.

A moving member 30 equipped with coils is disposed so as to be able to move in the linear direction while maintaining a uniform distance from the stator 20. A detector head 50 integrally disposed on the moving member 30 detects the magnetic flux of the stator 20 and sends the data to a position detecting circuit 80.

As shown in FIG. 2, the stator 20 is machined to a uniform size and arranged to have uniform intervals, but due to mounting error, vibration, magnetic flux density and the like, the distances between the detector head 50 and the magnets inevitably some certain variations.

Therefore, a measuring device (in this case, a laser length measuring machine) 100 is used to measure mechanical errors of the intervals between stator magnets in advance, and the corresponding correction data are stored in a storage unit 70.

The correction data are output to a control circuit 60, which sends control signals to a numerical control device 40 upon receiving a signal from the detector head 50, and drives the moving member 30.

Figure 3:
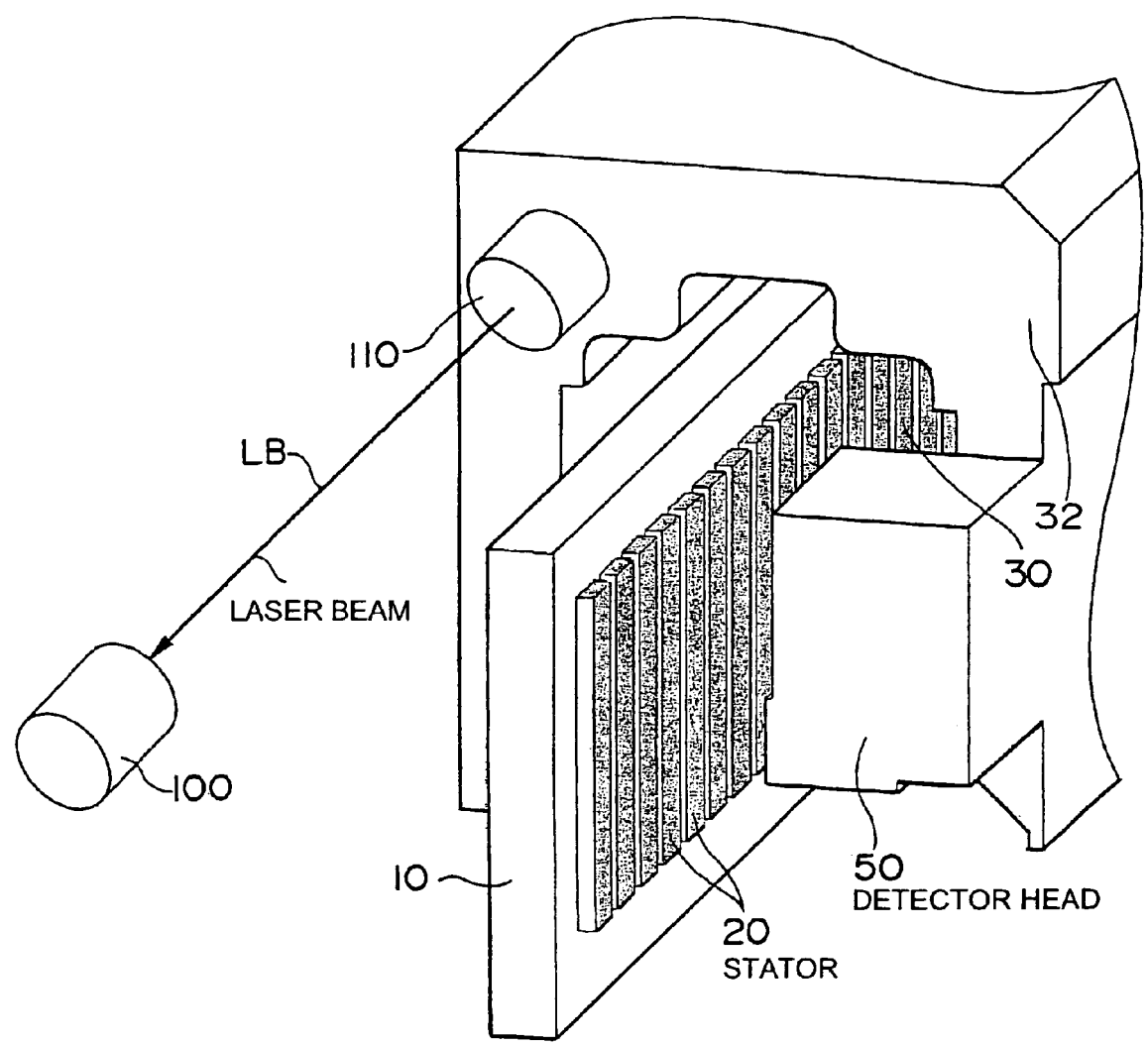
FIG. 3 is an explanatory view showing the relationship between a laser length measuring machine and a target attached to the housing of the moving member.
Figure 4:
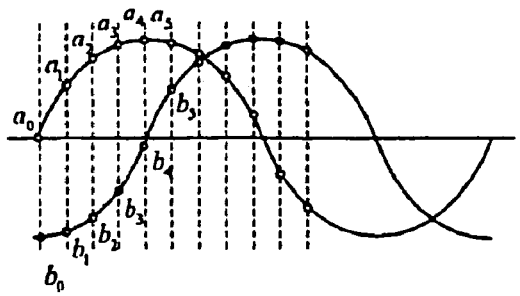
FIG. 4 is an explanatory view showing the structure of data of a nominal position of a magnet scale and data measured using a laser length measuring machine.

FIG. 3 is an explanatory view showing the relationship between a laser length measuring machine 100 and a target 110 attached to the housing 32 of the moving member 30, and FIG. 4 is a view showing the structure of data of the nominal position of the magnet scale and the data measured by the laser length measuring machine stored in the storage unit 70.

The fixed laser length measuring machine 100 irradiates laser beam LB to the target 110 attached to the moving member, and using reflected light, measures the distance between the laser length measuring machine 100 and the target 110 with high accuracy.

As illustrated in FIG. 4, the positional data of the stator 20 used as a magnet scale and the highly accurate position detection data of the laser length measuring machine 100 are compared, and based thereon, the correction value corresponding to the position of the stator 20 is computed and stored in the storage unit 70.

By carrying out the above-described computation of position detection data throughout the whole area of movement, the data of the laser length measuring machine can be read based on the magnet scale data.

Figure 5:
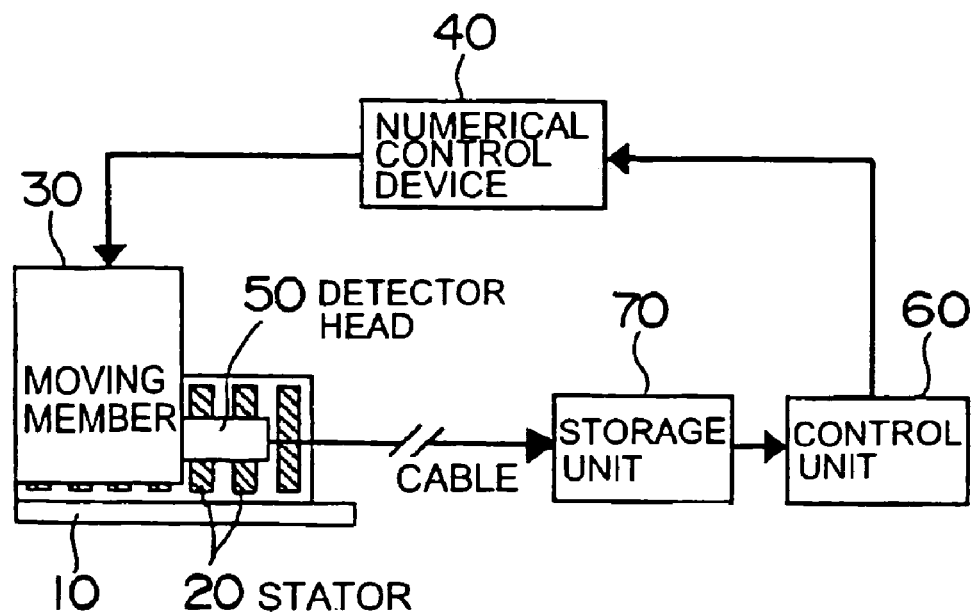
FIG. 5 is an explanatory view showing the configuration of a position detecting device of a linear motor using the stator.

FIG. 5 shows the configuration of a position detecting device of a linear motor using a stator 20 having the corresponding position correction data measured in advance.

The control circuit 60 sends a command to the numerical control device 40 to move the moving member 30 to a given position. The distance that the moving member 30 moves is detected by the detector head 50 sensing the change of magnetic flux of the stator 20, and the detected distance is sent to the control unit 60.

The storage unit 70 provided between the detector head 50 and the control unit 60 sends the correction value corresponding to the position data of the stator 20 constituting the magnet scale to the control unit 60, and based thereon, the control unit corrects the error caused mechanically by the stator.

According to the above configuration, it is possible to provide a highly accurate position detecting device for a linear motor.

A laser length measuring machine is used as an example of the measuring device in the above description of the preferred embodiments, but a linear scale can also be adopted to carry out the present invention.

Furthermore, the measurement of the position detecting data is normally carried out only once in the initial stage, but it can be carried out again if, for example, attachment error of magnets occurs by vibration or the data of the measurement device or the control unit are lost.

Even further, the position detecting circuit, the measuring device and the control unit are provided separately from the numerical control device, but they can also be contained in the numerical control device.

What is claimed is:

1. A position detecting device of a linear motor which is built into the linear motor, comprising:
    a stator having two kinds of magnets with different surface magnetism arranged alternately and at uniform intervals along a linear moving direction;
    a coil, which is a moving member, disposed movably in the linear direction while maintaining a uniform distance from the surface of the magnets constituting the stator;
    a detector for detecting the magnetic flux of the magnets;
    a position detecting circuit enabling the detector to detect position;
    a measuring device for measuring the position of the stator used as a magnet scale for correcting the position detecting circuit and for measuring the variation of arrangement of the magnets or sizes of the magnet members;
    a storage unit for storing a correction data obtained by comparing the stator position and the result of measurement of the measuring device; and
    a control unit for correcting the detection position based on the correction data stored in advance when carrying out positioning of the moving member.

2. The position detecting device of a linear motor according to claim 1, wherein the measuring device includes a laser length measuring machine.

3. The position detecting device of a linear motor according to claim 1, wherein the measuring device carries out the measurement only once in the initial stage.

4. The position detecting device of a linear motor according to claim 1, wherein the measuring device carries out the measurement again when an attachment error of the magnet occurs.

5. The position detecting device of a linear motor according to claim 1, wherein the measuring device carries out the measurement again when an error occurs to the data of the measurement device or the control unit.

6. The position detecting device of a linear motor according to claim 1, wherein the position detecting circuit, the measuring device or the control unit is built into the numerical control device.

* * * * *